J. BONDERSON.
HYDRANT.
APPLICATION FILED OCT. 1, 1917.
1,269,044.
Patented June 11, 1918.
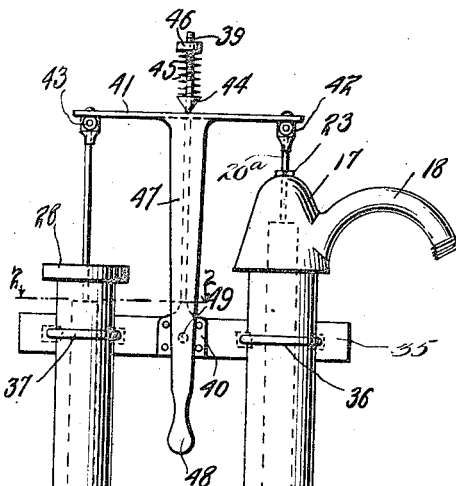
FIG. 2.
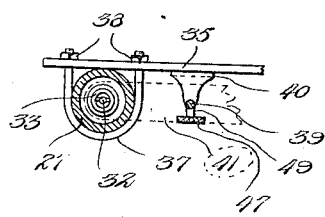
FIG. 1.
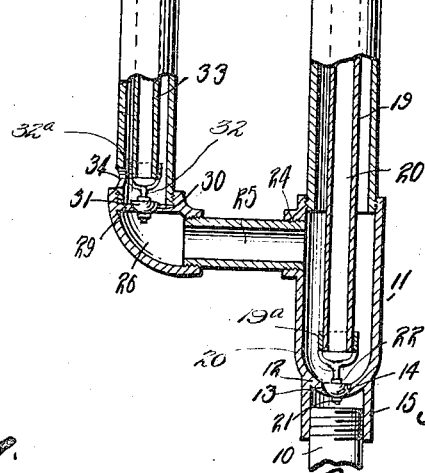
WITNESSES
W. C. Fielding
H. P. Hollingsworth
INVENTOR
John Bonderson
BY Richard B. Owen.
ATTORNEY

UNITED STATES PATENT OFFICE.

JOHN BONDERSON, OF EMERSON, NEBRASKA.

HYDRANT.

1,269,044.

Specification of Letters Patent. Patented June 11, 1918.

Application filed October 1, 1917. Serial No. 194,249.

*To all whom it may concern:*

Be it known that I, JOHN BONDERSON, a citizen of the United States, residing at Emerson, in the county of Dakota and State of Nebraska, have invented certain new and useful Improvements in Hydrants, of which the following is a specification.

This invention relates to hydrants designed for the issuance of water under pressure and has for its object to provide a hydrant which shall be simple, of few parts, easily operated to run on and cut off the flow of water therefrom, and which will permit the water that may be retained therein after cutting off the flow to be drained therefrom and thus prevent danger of breaking or freezing.

A further object of the invention is to provide a hydrant having the features named and also constructed in such manner that any leaking resulting from continued use may be corrected with little trouble without taking the hydrant apart.

With these as the principal objects in view, the invention consists in the novel construction, combination and arrangement of parts hereinafter described, pointed out in the appended claims and illustrated in the accompanying drawings, in which, Figure 1 is a view in elevation of the improved hydrant, the lower portion being shown in section to disclose its interior construction, and, Fig. 2 is a horizontal sectional view on the line 2—2 of Fig. 1.

In the drawing, 10 indicates the terminal end of a pipe delivering water under pressure and opening upwardly and threaded on the lower end of a casing 11 having a hemispherical or other shaped bottom 12 through which is formed an opening 13 for the passage of water from the pipe 10, said opening also serving as a seat for the stop valve 14. Projecting downwardly from the bottom of the casing 11 is a short socket 15 into which the end of the pipe 10 is threaded and which communicates through the opening 13 with the casing 11.

Threaded into the top of the casing 11 is a section of pipe 16 that extends in a vertical direction and may be of any length to form the body of the hydrant. The upper end of the pipe section 16 is closed by a conically shaped cap 17 having at one side a curved nozzle or goose neck 18 through which water is discharged, the open end of said nozzle being directed downward as shown, and terminally threaded for a hose pipe connection. Within the pipe section 16 and extending longitudinally therethrough into the cap 17 at its upper end and the casing 11 at its lower end nearly to the bottom 12 of said casing is a small pipe 19 spaced from the walls of the pipe section. On the lower end of the pipe 19 is secured a collar 19$^a$ to which is attached a short rod 20, forked at its upper end for connection with said collar and bearing at its lower end a valve 14. The valve is preferably made of rubber of hemispherical form and is secured on the end of the rod 20 by a nut 21 forcing the valve against a fixed collar 22 on said rod. The top of the cap 17 is fitted with a bushing 23 through which a short rod 20$^a$ is arranged to slide, this rod being carried by a collar attached to the upper end of the pipe 19, a construction similar to that on the lower end of said pipe.

At one side of the casing 11 near the top is formed a flanged opening 24 in which is threaded one end of a nipple 25 that projects horizontally from the casing and has an elbow 26 threaded on its opposite end. The elbow 26 opens upwardly and in said open end is threaded the lower end of a pipe section 27 which may be of slightly less diameter than the pipe section 16 but which extends upwardly to substantially the same height and has its upper end closed by a screw cap 28. Within the elbow 26 is a horizontal partition 29 having a central opening 30 for the passage therethrough of water, said opening forming a seat for a hemispherical valve 31, similar to the valve 14, and like it mounted on the lower end of a short rod or stem 32 that extends upwardly to a collar 32$^a$ fastened on the lower end of a small pipe 33 within the pipe section 27. In one side of the pipe section 27 just above its connection with the elbow 26 is formed an opening 34 through which water from the hydrant drains in a manner to be described later.

The upper ends of the pipe sections 16 and 27 are connected together just below their caps 17 and 28 by a cross bar 35 which bears upon one side of each pipe and is connected to them by U-shaped staples 36 and 37 embracing said pipe sections and extending through openings in the cross bar 35. Nuts 38 are threaded on the ends of the staples to draw them and the cross bar tightly against the pipe standard. Riveted or screwed to the cross bar 35 midway between the pipe sections 16 and 27 is a vertical rod 39 the lower end of which is flattened as at 40 to permit of attachment to the cross bar and which extends upwardly above the top of the cap 17.

A cross head or equalizer 41 lies normally in a horizontal plane and has at one end a clevis 42 connected to the upper end of the rod 20ª. A similar clevis 43, pivoted to the other end of the cross head is threaded on a rod 32ᵇ projecting from a collar on the upper end of the small pipe 33. Through the center of the equalizer 41 is an opening for the passage of rod 39, said rod having slidably thereon a fulcrum block 44 having a knife edge directed downwardly and bearing on the top of the equalizer. The fulcrum block 44 is forced downwardly by a coil spring 45 surrounding the rod 39 and bearing against a nut 46, by means of which the tension of said spring is adjusted. From what has been said it is apparent that the pressure of spring 45 forces the fulcrum block against the equalizer 41 and the latter in turn being forced downwardly, depresses the valve connections and seat the valves 14 and 31, thereby closing the openings 13 and 30 so that fluid cannot pass upwardly from pipe 10 to the goose neck 18, nor can any fluid in the hydrant pass through opening 30 and then escape through drain opening 34.

Depending from the cross head or equalizer 41 at the center thereof is an arm 47 that extends below the cross bar 35 and terminates in a handle 48, for rocking the cross head to open valve 14 when the handle is moved toward pipe 16 and open valve 31 when swung in opposite direction toward pipe 27. A pin 49 projects from the cross bar 35 against the end of which, arm 47 rests when in neutral position, see Fig. 2, the pin engaging and locking the arm to hold a valve open in either position of the arm.

Constructed as described, when it is desired to draw water through the nozzle 18 the handle 48 is grasped by the hand and the arm 47 swung toward the pipe standard 16. Both valves being seated, the valve 31 cannot be depressed lower, therefore the cross head or equalizer swings on the clevis 43 as an axis, raising the clevis 42 and the valve 14, permitting water to flow from pipe 10 through opening 13 into the chamber 11 and then up through pipe section 16 to the nozzle 18. This movement, as is evident compresses spring 45 so that when the hand disengages the lever 47, said spring will close the valve 14. Movement of the lever in the opposite direction will raise valve 31 from its seat and permit all water in the pipe section 16 above the level of the outlet 34 to flow through nipple 25, elbow 26 and pipe section 27 to the outlet 34. If it be desired to hold either valve open for an appreciable time, the arm 47 is engaged by its edge with pin 49.

One of the principal advantages possessed by this hydrant is the arrangement of the various opening elements in a simple manner so that when the handle is disengaged, it will be returned to a neutral position by the spring and so close both valves 14 and 31, holding said valves closed. If the spring 45 be not sufficiently tight, or the valve 14 be worn so that it does not seat perfectly, the water will pass through said valve and rise in pipe 16, causing a dripping from the spout or goose neck 18, thus indicating the imperfect fitting of the valve 14.

What is claimed is:

1. A hydrant having an inlet valve and an outlet, a drain valve between the inlet valve and the outlet, yieldable means connected to said valves for normally holding them closed, and means connected to said yieldable means for opening either valve while maintaining the other valve closed.

2. A hydrant having an inlet valve at one end and an outlet at the opposite end, a drain valve for the hydrant above the inlet valve, a valve rod for each of said valves, a cross head pivotally connected at its ends to the valve rods, resilient means acting on the cross head to maintain both valves closed when the hydrant is out of use, and means for rocking said cross head to open either valve, the pivoted connection of the other valve serving as a fulcrum for the cross head.

3. A hydrant having a straight body with an inlet valve at one end and an outlet at the opposite end, a pipe section parallel to said body and opening thereinto a short distance above the inlet valve, a drain valve in said pipe section, manually operative rocking means connected to said valves for opening either valve without actuating the other valve, and resilient means for normally holding both valves in closed position and also closing the open valve upon release of the rocking means.

4. A hydrant comprising a straight body having a casing at its lower end and an outlet at its upper end, a valve in said casing controlling the flow of water into the hydrant, a pipe section parallel to the hydrant body and connected at its lower end to the casing above the inlet valve, a drain valve in the bottom of said pipe section and adjacent a drain opening in the side thereof, a valve stem connected to each valve and extending upwardly above the top of the hydrant, a cross head connected to said valve stems, resilient means acting on said cross head to maintain said valves in closed position, and means for rocking said cross head to raise one of said valves while maintaining the other in closed position.

5. A hydrant having an inlet valve at its lower end and an outlet at its upper end, a pipe section parallel to said hydrant connected at its lower end thereto a short distance above the valve, said pipe section having a drain opening near its lower end, a drain valve in said pipe section below the drain opening, a valve stem extending upwardly from each valve above the top of the hydrant, a cross head pivotally connected to each valve rod, a shifting fulcrum resiliently bearing on said cross head intermediate the valve rod connections, and means for rocking said cross head to hold either of said valves closed while the other is opened.

6. A hydrant having an inlet valve and a drain valve at the lower end thereof and an outlet at the upper end, parallel valve stems extending upwardly above the top of the hydrant, a cross head pivotally connected at its ends to the respective valve rods, a rod fixed to said hydrant passing freely through an opening in said cross head intermediate its ends, a fulcrum slidable on said rods and bearing on said cross head, an adjustable spring maintaining said fulcrum in engagement with the cross head, and means on said cross head for rocking the same to hold one of said valves closed while the other is opened.

In testimony whereof I affix my signature in presence of two witnesses.

JOHN BONDERSON.

Witnesses:
HERMAN OFT,
F. B. SMITH.

Copies of this patent may be obtained for five cents each, by addressing the "Commissioner of Patents, Washington, D. C."